United States Patent [19]

Grossman et al.

[11] Patent Number: 5,350,542
[45] Date of Patent: Sep. 27, 1994

[54] NUCLEAR FUEL WITH ISOTOPICALLY DEPLETED BURNABLE ABSORBER

[75] Inventors: Leonard N. Grossman, Herculaneum, Mo.; Alf I. Jonsson, W. Suffield, Conn.

[73] Assignee: Combustion Engineering, Inc., Windsor, Conn.

[21] Appl. No.: 83,523

[22] Filed: Jun. 30, 1993

Related U.S. Application Data

[62] Division of Ser. No. 761,438, Sep. 18, 1991, Pat. No. 5,250,231.

[51] Int. Cl.$^5$ ............................................. C09K 11/04
[52] U.S. Cl. ................................... 252/636; 376/184; 376/189; 376/419; 423/2
[58] Field of Search .............. 376/184, 189, 157, 339, 376/419; 252/636; 423/2

[56] References Cited

U.S. PATENT DOCUMENTS

| | | | |
|---|---|---|---|
| 4,568,436 | 2/1986 | Feichtner et al. | 204/157.22 |
| 4,711,768 | 12/1987 | Peterson et al. | 423/21.5 |
| 5,183,548 | 2/1993 | Snyder et al. | 204/299 R |
| 5,202,005 | 4/1993 | Paisner et al. | 204/157.22 |

*Primary Examiner*—Donald P. Walsh
*Assistant Examiner*—Meena Chelliah
*Attorney, Agent, or Firm*—Ronald P. Kananen; John H. Mulholland

[57] ABSTRACT

By using AVLIS or other methods capable of providing a depleted isotopic mixture, troublesome isotopes such as $Gd^{154}$, $Gd^{156}$ and $Er^{166}$ are selectively removed from naturally occurring isotopic mixtures, while avoiding the additional costs associated with complete fractionation of the mixture. Such mixtures can be used to provide a burnable nuclear fuel absorber having a selectively depleted isotope or isotopes. In particular, the invention concerns burnable absorbers containing erbium with a depleted 166 isotope, gadolinium with a depleted 156 isotope or with depleted 154 and 156 isotopes, and methods for making such absorbers.

12 Claims, No Drawings

NUCLEAR FUEL WITH ISOTOPICALLY DEPLETED BURNABLE ABSORBER

This application is a division of application Ser. No. 07/761,438 filed Sep. 18, 1991 now U.S. Pat. No. 5,250,231 patented on Oct. 5, 1993.

FIELD OF THE INVENTION

The present invention relates to burnable absorbers for use in connection with nuclear fuels. More particularly, this invention relates to burnable absorbers that are depleted with respect to a specific isotope to provide a reduced residual and therefore lower fuel cycle costs. Still more particularly, this invention relates to erbium having its naturally occurring 166 isotope depleted by an isotope separating process, such as the AVLIS process, or to gadolinium with its 156 isotope depleted.

BACKGROUND OF THE INVENTION

During nuclear fission, a fissionable nuclear fuel is bombarded with neutrons, converting the fuel into two or more fission products of lower atomic number. In addition to the fission products, this reaction produces a net increase in neutrons which, in turn, bombard additional nuclear fuel, thus forming a controlled chain reaction. During steady-state operation, neutron absorbers are used to ensure that there is no net increase in the number of neutrons available to produce fission reactions. One group of such neutron absorbers is known as burnable absorbers.

Burnable absorbers, also known as "burnable poisons," are so called because their ability to absorb neutrons decreases with increased exposure to nuclear fission. This characteristic can be beneficially used. For example, all nuclear fuels became depleted after a period of operation and must eventually be replaced. Since fuel replacement is costly, it is desirable to increase the lifetime of the fuel by initially providing as much fuel as possible. Fuel, however, is at its highest reactivity when first introduced into the reactor and, at this stage, it is imperative that excess neutrons be absorbed to maintain the reactor core in a subcritical condition.

Such excess neutrons are absorbed by introducing a burnable absorber in the core. The burnable absorber is one or more specific isotopes within an element For example, $Er^{167}$ is a burnable absorber which occurs in nature within the element erbium. In absorbing neutrons, the burnable absorber is converted to an isotope having a lower neutron capture cross-section, thus reducing the overall ability of the burnable absorber to absorb neutrons. At the same time, the fission process produces more and more fission product absorbers (poisons) which create the ability of the fuel to absorb neutrons without causing fission. For a well-designed nuclear reactor, the buildup of fission product poisons is about offset by the depletion of burnable absorbers.

Burnable absorbers can be mixed with the fuel, coated on the outer layer of the fuel, provided in the core of the fuel, or provided separate from the fuel. Materials for burnable absorbers include boron, gadolinium, samarium, europium, cadmium, hafnium, dyspropsium, indium, erbium and other materials which, upon absorption of neutrons, display a net overall decrease in neutron capture cross section.

The elements used for burnable absorber materials naturally occur in isotopic mixtures. As illustrated in the following tables, each isotope has a different thermal neutron capture cross-section:

| Capture Isotope Mass (Barns) | Natural Abundance | Thermal Neutron Cross-Section |
|---|---|---|
| Properties of Naturally Occurring Erbium Isotopes | | |
| 162 | .136% | 160 |
| 164 | 1.56% | 13 |
| 166 | 33.41% | 10 |
| 167 | 22.94% | 700 |
| 168 | 27.07% | 1.9 |
| 170 | 14.88% | 6 |
| Properties of Naturally Occurring Gadolinium Isotopes | | |
| 152 | .2% | 125 |
| 154 | 2.15% | 102 |
| 155 | 14.73% | 61000 |
| 156 | 20.47% | 1000 |
| 157 | 15.68% | 254000 |
| 158 | 24.87% | 3.5 |
| 160 | 21.90% | 0.77 |

U.S. Pat. No. 4,711,768 describes a scheme wherein liquid chromatography is used to separate those gadolinium isotopes having the highest thermal neutron capture cross-section (i.e., 155, 156 and 157) from the other isotopes for use in burnable absorbers. The amount of gadolinium that can be added to the nuclear fuel is apparently limited because fuel thermal conductivity and melting temperature decrease as gadolinium concentration increases. Thus, the cost-to-benefit ratios of gadolinium can be decreased by isolating the isotopes having a high capture cross-section from those having low capture cross-section.

Fractionation of naturally occurring isotopes into individual components, however, can be quite expensive, thus reducing the cost-saving benefits of the separation. Furthermore, contrary to previous teachings, it was found that adequate cost savings can be realized by removing only a single isotope. For example removal of the 166 isotope of erbium either completely or to a level of about 50% or more of the original 166 isotope concentration will obtain substantial benefits.

As another example, in the case of gadolinium, significant cost savings can be realized by the removal of the 156 isotope. This is contrary to the above teaching which suggests that only those naturally occurring isotopes having low thermal neutron capture cross-sections should be removed. It was also found that although the inclusion of isotopes with low capture cross-sections may tend to decrease thermal conductivity and melting temperature, changes in thermal neutron capture cross-section with operation should be of higher concern when providing cost-effective burnable absorbers. Again, taking gadolinium as an example, it should be noted that the 156 isotope has a thermal neutron capture cross-section of about 1000. After capturing a neutron, however, this isotope converts to the 157 isotope, which has a capture cross-section of 254,000. Since burnable absorbers are designed to decrease in overall thermal neutron capture cross-section over time, the 156 isotope is undesirable and should be removed. The same is true for the erbium 166 isotope which, upon neutron absorption to form the 167 isotope, undergoes a 70-fold increase in thermal neutron capture cross-section.

Specific methods are available for the removal of selected isotopes from an isotopic mixture to provide a depleted isotopic mixture. One such method is atomic vapor laser isotope separation ("AVLIS"). AVLIS was developed for large scale uranium enrichment applications at the Lawrence Livermore National Laboratory. AVLIS functions by first heating and vaporizing a sample of interest, followed by laser irradiation at a wavelength specifically selected to ionize only the isotope to be depleted. Once ionized, the isotope is removed using electric fields, leaving behind the depleted isotopic mixture of interest.

SUMMARY OF THE INVENTION

It is therefore an object of this invention to selectively remove troublesome isotopes such as $Gd^{156}$ and $Er^{166}$ from naturally occurring isotopic mixtures, while avoiding the additional costs associated with complete fractionation of the mixture. This object will be met by subjecting a naturally occurring isotopic mixture of the element of interest to AVLIS or other methods capable of isolating a single isotopic component and providing a depleted isotopic mixture.

Accordingly, this invention relates to a burnable nuclear fuel absorber having a selectively depleted isotope. In particular, the invention relates to erbium with a depleted 166 isotope and to gadolinium with a depleted 156 isotope, and to methods for making such absorbers.

DETAILED DESCRIPTION

The burnable absorbers of the present invention require the selective removal of specific isotopes from a naturally occurring isotopic mixture. Two such mixtures, naturally occurring erbium and gadolinium, are tabulated in the Background of the Invention.

One way of removing undesirable isotopes is by fractionation of the material using techniques such as gas diffusion, centrifugal separation or liquid chromotography, followed by the recombination of all fractions except the specific unwanted isotopes. However, since it is desired to remove only a single isotope, complete fractionation is not necessary and may be excessively costly.

The preferred separation method for the practice of the present invention is AVLIS. AVLIS selectively excites one or more specific isotopes using an excitation beam of laser radiation. The excitation beam is precisely tuned to specific wavelengths having a line-width narrow enough to avoid excitation of other isotopes. In AVLIS, the atomic vapor of a naturally occurring isotopic mixture is irradiated with one or more excitation beams which cause transitions between specific atomic states and from one or more discrete atomic states to the ionization continuum or to resonances lying above the ionization threshhold. The resulting ions are then subjected to an electric field that drives them onto a collector plate. The collector plate either forms or is adjacent to the anode of the electric field producing apparatus. The remainder of the isotopic distribution passes through the apparatus and is recycled or collected downstream.

In the example of erbium, shown in the above table, $Er^{166}$ is collected at the collector plate, while the depleted isotopic mixture (i.e., $Er^{162}$, $Er^{164}$, $Er^{167}$, $Er^{168}$ $Er^{170}$ and reduced amounts of $Er^{166}$) passes through the apparatus and is recycled or collected downstream. Similarly, in the case of gadolinium, $Gd^{156}$ is collected at the collector plate, while the depleted isotopic mixture, (i.e., $Gd^{152}$, $Gd^{154}$, $Gd^{155}$, $Gd^{157}$, $Gd^{158}$, $Gd^{160}$ and reduced amounts of $Gd^{156}$) is recycled or collected downstream. Alternatively, $Gd^{154}$ can be removed in addition to the $Gd^{156}$. The depleted isotopic mixtures are then used to form burnable absorbers.

A nuclear fuel rod typically comprises a tubular cladding, usually formed of a zirconium alloy, having top and bottom end plugs to form a chamber. In the chamber, numerous cylindrical fuel pellets are stacked end to end. The diameter of the pellets is somewhat less then the inside diameter of the tubular cladding to allow for the expansion in the pellets during operation.

If the burnable absorber is to be interspersed throughout the fuel pellet, a nuclear fuel, preferably uranium oxide, is mixed with one or more burnable absorber materials, preferably gadolinium and/or erbium oxides. This powder mixture is then compacted to the desired shape and size, followed by sintering to produce nuclear fuel pellets.

Alternately, the burnable absorber can be applied as a coating to the zirconium alloy tubular cladding or to previously compacted, and preferably sintered, uranium fuel pellets. The coating can be applied by 1) plasma spraying or flame spraying the burnable absorber, 2) dipping the pellets or cladding into a slurry of the burnable absorber, preferably containing an additional ceramic binder, and sintering, 3) vapor coating the pellets or cladding, 4) electron beam bombardment of the burnable absorber on the pellet or cladding, or 5) other methods known in the art.

Moreover, the burnable absorbers can be introduced into the reactor as discrete rods, normally by insertion into spaces designated for control rods. As above, the rod comprises a metallic tube or cladding, preferably of a zirconium alloy, having top and bottom end plugs forming a chamber. The chamber is then filled with pellets comprising a burnable absorber preferably selected from erbium and gadolinium compounds, and a refractory material, such as aluminum oxide and zirconium oxide. The pellets are formed by mixing the burnable absorber material with the refractory material, compressing and sintering.

The above embodiments are not intended to imply a restriction on the possible ways in which the burnable absorber can be depleted and incorporated into a fuel assembly, but are only intended as guidelines by which the burnable absorber can be so depleted and incorporated.

What is claimed is:

1. An isotopic mixture of isotopes of an element gadolinium suitable for use as a burnable absorber, wherein:
    said mixture comprises a naturally occurring but depleted isotopic mixture that is selectively and substantially depleted only with respect to a first naturally occurring isotope, said first isotope having an isotope mass that is one less than a second naturally occurring isotope of said element, said second isotope having a thermal neutron cross-section which is higher than the thermal neutron cross-section of said first isotope.

2. The isotopic mixture of claim 1 wherein said first isotope is $Gd^{156}$ and said second isotope is $GD^{157}$.

3. A method of treating a naturally occurring isotopic mixture of isotopes of an element gadolinium comprising using an isotopic separation process sufficient to selectively remove a substantial portion of only a first naturally occurring isotope having an isotope mass that is one less than a second naturally occurring isotope of said element, said second isotope having a thermal neutron cross-section higher than the thermal neutron cross-section of said first isotope and said first isotope being depleted to about 50% or more of its natural concentration.

4. The method of claim 3 wherein said first isotope is $Gd^{156}$ and said second isotope is $Gd^{157}$.

5. An isotopic mixture of isotopes of an element gadolinium suitable for use as a burnable absorber, wherein:
said mixture comprises a naturally occurring but depleted isotopic mixture that is selectively and substantially depleted only with respect to a first group of one or more naturally occurring isotopes, said first group of one or more isotopes each having an isotope mass that is one less than a corresponding second group of one or more isotopes of said element, each of said second group of one or more isotopes having a thermal neutron cross-section that is higher than the thermal neutron cross-section of each of said corresponding first group of one or more isotopes.

6. The isotopic mixture of claim 5 wherein said first group of one or more isotopes is $Gd^{156}$ and said corresponding second group of one or more isotopes is $Gd^{157}$.

7. The isotopic mixture of claim 5 wherein said first group of one or more isotopes is $Gd^{154}$ and $Gd^{156}$, and said corresponding second group of one or more isotopes is $Gd^{155}$ and $Gd^{157}$.

8. A method of treating a naturally occurring isotopic mixture of isotopes of an element gadolinium comprising using an isotopic separation process sufficient to selectively and substantially remove only a first group of one or more naturally occurring isotopes having an isotope mass that is one less than a corresponding second group of isotopes having a thermal neutron cross-section higher than the thermal neutron cross-section of each of said corresponding first group of isotopes and each of said first group of isotopes being depleted to about 50% or more of its natural concentration.

9. The method of claim 8 wherein said first group of one or more isotopes is $Gd^{156}$ and said corresponding second group of one or more isotopes is $Gd^{157}$.

10. The method of claim 8 wherein said first group of one or more isotopes is $Gd^{154}$ and $Gd^{156}$, and said corresponding second group of one or more isotopes is $Gd^{155}$ and $Gd^{157}$.

11. The method of claim 3 wherein said isotopic separation process is AVLIS.

12. The method of claim 8 wherein said isotopic separation process is AVLIS.

* * * * *